(12) United States Patent
Klasen et al.

(10) Patent No.: US 8,898,475 B2
(45) Date of Patent: Nov. 25, 2014

(54) METHOD, CONTROLLER AND SYSTEM FOR DETECTING INFRINGEMENTS OF THE AUTHENTICITY OF SYSTEM COMPONENTS

(75) Inventors: Wolfgang Klasen, Ottobrunn (DE); Angela Schattleitner, Tuntenhausen (DE)

(73) Assignee: Siemens Aktiengesellschaft, München (DE)

( * ) Notice: Subject to any disclaimer, the term of this patent is extended or adjusted under 35 U.S.C. 154(b) by 56 days.

(21) Appl. No.: 13/360,082

(22) Filed: Jan. 27, 2012

(65) Prior Publication Data

US 2012/0124385 A1   May 17, 2012

(30) Foreign Application Priority Data

Apr. 20, 2006 (DE) .......................... 10 2011 004 978

(51) Int. Cl.
*H04L 29/06* (2006.01)
*H04L 9/32* (2006.01)
(52) U.S. Cl.
CPC .................................. *H04L 9/3236* (2013.01)
USPC ............................. 713/179; 380/270; 235/385
(58) Field of Classification Search
CPC . H04L 63/0492; H04L 63/0869; H04L 9/323;
H04L 9/321; H04L 9/3236; H04L 9/0836;
H04L 9/3281; H04L 9/32; H04L 2201/3233
USPC ........................................................ 713/179
See application file for complete search history.

(56) References Cited

U.S. PATENT DOCUMENTS

| | | | | |
|---|---|---|---|---|
| 7,278,025 B2* | 10/2007 | Saito et al. | .................... | 713/185 |
| 7,791,451 B2* | 9/2010 | Lei et al. | ........................ | 340/5.2 |
| 2003/0221107 A1* | 11/2003 | Kang | ............................ | 713/176 |
| 2006/0031601 A1* | 2/2006 | Elliott et al. | ..................... | 710/22 |
| 2006/0086791 A1* | 4/2006 | Austin | .......................... | 235/385 |
| 2006/0143453 A1* | 6/2006 | Imamoto et al. | ............. | 713/169 |

FOREIGN PATENT DOCUMENTS

| | | |
|---|---|---|
| DE | 199 63 329 A1 | 7/2001 |
| DE | 10 2007 034 527 A1 | 2/2009 |
| DE | 10 2008 003574 A1 | 7/2009 |
| WO | WO 2005 112459 A1 | 11/2005 |
| WO | WO 2009 149731 A1 | 12/2009 |

OTHER PUBLICATIONS

Alfred J. Menezes, Paul C. van Oorschot, Scott A. Vanstone: Handbook of Applied Cryptography. Boca Raton: CRC Press, Oct. 1996, Chapter 9 and 10, pp. 231-331 and 385-405,http://www.cacr.math.uwaterloo.ca/hac/.
Datenfunk stärkt Plagiatschutz im Maschinenbau. In: VDI Nachrichten, Jun. 25, 2010, http://www.vdi-nachrichten.com/artikel/Datenfunk_st%C3%A4rkt_Plaglatschuiz_im_Maschinenbau/48432/2/GoogleNews.

* cited by examiner

*Primary Examiner* — Jung Kim
*Assistant Examiner* — Ghodrat Jamshidi
(74) *Attorney, Agent, or Firm* — Henry M. Feiereisen LLC

(57) ABSTRACT

In a method for detecting infringements of the authenticity of a system component an authentication request is sent from a controller to an authentication device of the system component. A first authentication code is calculated in the authentication device by applying a shared one-way function to an identification code, stored in the authentication device, for the system component. A second authentication code in the controller is calculated by applying the shared one-way function to an identification code, stored in the controller, for the system component, and an authentication response including the first authentication code is sent from the authentication device to the controller. The first authentication code is compared with the second authentication code in the controller for detecting infringements of the authenticity of the system component.

13 Claims, 1 Drawing Sheet

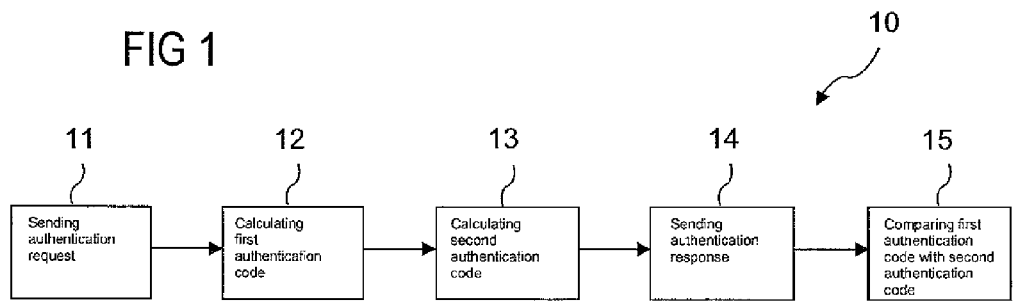
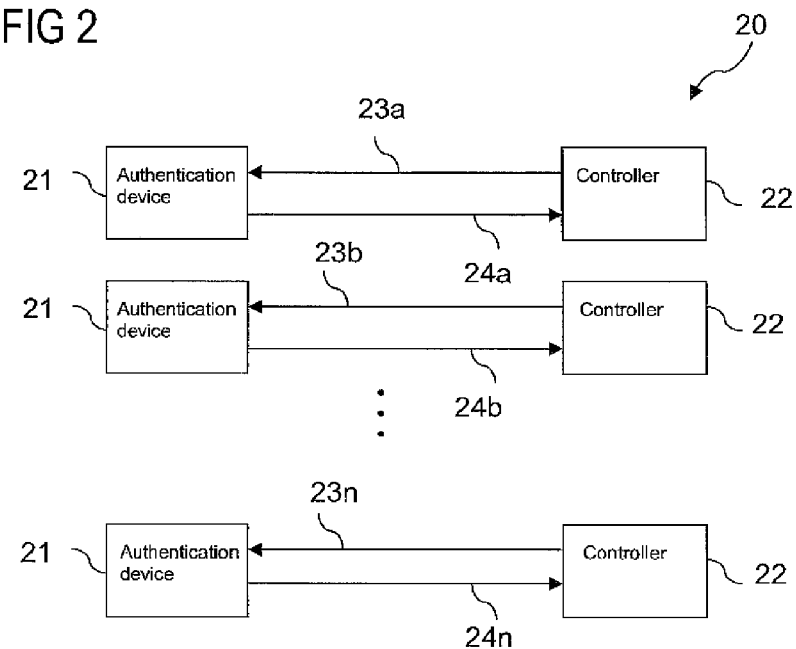
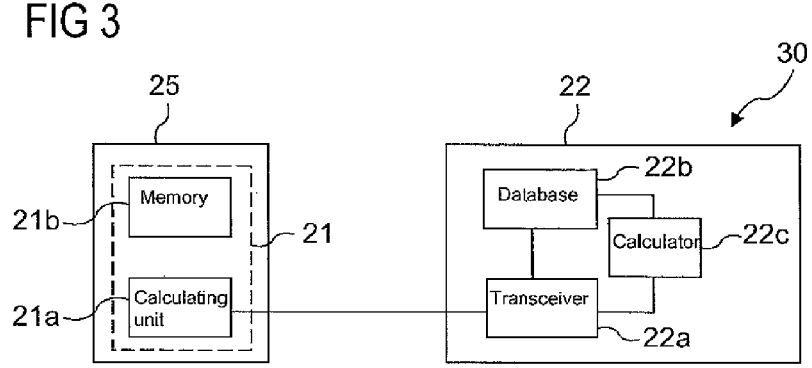

METHOD, CONTROLLER AND SYSTEM FOR DETECTING INFRINGEMENTS OF THE AUTHENTICITY OF SYSTEM COMPONENTS

CROSS-REFERENCES TO RELATED APPLICATIONS

This application claims the priority of German Patent Application, Serial No. 10 2011 004 978.9, filed Mar. 2, 2011 pursuant to 35 U.S.C. 119(a)-(d), the disclosure of which is incorporated herein by reference.

BACKGROUND OF THE INVENTION

The present invention relates to a method, to a controller and to a system for detecting infringements of the authenticity of system components, in particular of machine and/or tool components.

The following discussion of related art is provided to assist the reader in understanding the advantages of the invention, and is not to be construed as an admission that this related art is prior art to this invention.

Complex machine tools are increasingly being assembled in a modular design from individual components from different manufacturers. In this case the manufacturers usually guarantee the safety and the quality of the corresponding components, so operators of machine tools wish to ensure that the installed components also originate from the manufacturers which have been selected and checked in advance.

In turn the installation of cheap or plagiarized components often jeopardizes the safety of the entire system or machine tool, since these are subject to neither safety tests, quality standards nor certifications. Corresponding components are frequently imitated by manufacturers without it being possible to discern a difference from the corresponding copied branded articles from the outside. The undetected installation of components incorrectly identified as original products can compromise the safety of the machine tool and entail significant deficiencies, loss of safety-related approval or liability and guarantee problems.

It is therefore important for the operator of machine tools or other systems to check each of the components used in the machine or system for originality and authenticity. Assemblies and components are usually identified by a manufacturer-specific serial number. The serial number can initially be checked during installation or initial operation by a system engineer. This occurs once and assures the operator of the machine tool or system of the proper and authenticated installation of the corresponding components.

All the same, component serial numbers can be duplicated relatively easily and authenticity therefore feigned. To prevent this global databases are used in which the authentic serial numbers are managed. Via "Track & Trace" methods the manufacturers' serial numbers from the global database can be compared with the current serial number and the logistical path of the product tracked. This is often connected with great administration and maintenance effort for the database. Furthermore, it is also necessary to protect the data communication of the global database with the components to be authenticated against manipulation and exposure of the confidential serial numbers.

In addition there are also various other methods of initial authenticity verification such as the checking of "physical unclonable functions", the effectiveness of which is assessed differently depending on the method.

However, following fitting or installation it is often difficult to guarantee the continued authenticity of the installed components.

It would therefore be desirable and advantageous to provide an improved, inexpensive and easy-to-implement solution for detecting infringement of authenticity following initially successful authenticity verification of system or machine tool components.

SUMMARY OF THE INVENTION

According to one aspect of the present invention, a method for detecting infringements of an authenticity of a system component includes sending an authentication request from a controller to an authentication device of the system component, calculating a first authentication code in the authentication device by applying a shared one-way function to a first identification code, stored in the authentication device, for the system component, calculating a second authentication code in the controller by applying the shared one-way function to a second identification code, stored in the controller, for the system component, sending an authentication response with the first authentication code from the authentication device to the controller, and comparing in the controller the first authentication code with the second authentication code for detecting infringements of the authenticity of the system component.

According to another advantageous feature of the present invention, the sent first authentication code can be stored in the controller as updated identification code for the system component. The calculated first authentication code can be stored in the authentication device as an updated identification code for the system component. Simultaneous storing of the original identification code and the current authentication code can be avoided as a result, and this is advantageous in the case of components with resource limitations. Furthermore, bypassing authenticity verification by resetting the controller and/or system component to the original identification code is impeded since this identification code is overwritten and is therefore no longer known.

According to another advantageous feature of the present invention, an error message can be stored in an error protocol in the controller when the comparison of the first authentication code to the second authentication code results in a difference between the first authentication code and the second authentication code. As a result an authentication problem can also be monitored and checked after a certain time delay, by way of example during a routine maintenance interval, without immediate intervention to check the system components being necessary.

According to another advantageous feature of the present invention, an error message can be stored in an error protocol in the controller, when the sending of the authentication response fails.

According to another advantageous feature of the present invention, the one-way function can be a prototype-resistant low-collision hash function. Functions of this kind can be reproduced, are easy to implement and reduce the risk of manipulation, which cannot be detected, of the authentication of the system component with respect to the controller.

According to another advantageous feature of the present invention, the authentication request can include a randomly created request code, wherein the first authentication code can be calculated in the authentication device and the second authentication code can be calculated in the controller on the basis of the combination of the identification code with the randomly generated request code. An attack, which is based on advance calculation of the authentication code, can thus be ruled out.

According to another aspect of the present invention, a controller for detecting infringements of the authenticity of a system component includes a transceiver configured to send an authentication request to an authentication device of the system component, and to receive a first authentication code as a response to the authentication request, wherein the first authentication code is calculated by applying a shared one-way function to a first identification code, stored in the authentication device, for the system component, a database configured to store a second identification code for the system component; and a calculator configured to calculate a second authentication code by applying the shared one-way function to the second identification code stored in the database, and to compare the first authentication code with the second authentication code for detecting infringements of the authenticity of the system component.

According to another advantageous feature of the present invention, the database can be configured to store the first authentication code received by the transceiver as an updated identification code for the system component.

According to another advantageous feature of the present invention, the calculator can be configured to store an error message in an error protocol in the database, when the comparison of the first authentication code to the second authentication code results in a difference between said first and said second authentication codes.

According to another advantageous feature of the present invention, the calculator can be configured to store an error message in an error protocol in the database when the transceiver does not receive a response within a defined period of time after the authentication request.

According to another advantageous feature of the present invention, the one-way function can be configured as a prototype-resistant, low-collision hash function.

According to still another aspect of the present invention a system for the detection of infringements of the authenticity of a system component includes a controller which includes a transceiver configured to send an authentication request to an authentication device of the system component, and to receive a first authentication code as a response to the authentication request, wherein said first authentication code is calculated by applying a shared one-way function to a first identification code, stored in the authentication device, for the system component, a database configured to store a second identification code for the system component, and a calculator configured to calculate a second authentication code by applying the shared one-way function to the second identification code stored in the database, and to compare the first authentication code with the second authentication code for detecting infringements of the authenticity of the system component; and an authentication device configured to calculate the first authentication code by applying the shared one-way function to the first identification code, and to send the first authentication code to the transceiver as the response to the authentication request.

The system thus includes an inventive controller and an authentication device, which is associated with the system component, and which is designed to calculate on the basis of an identification code, stored in the authentication device, for the system component and with the aid of the shared one-way function a first authentication code as a response to the authentication request and to send it to the transceiver.

According to another advantageous feature of the present invention, the authentication device can include a RFID-tag, and the transceiver can include a RFID-reading device. With this hardware a system for detecting infringements of the authenticity can be created for system components simply, inexpensively and so it is easy to operate.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows a schematic diagram of one embodiment of a method for detecting infringements of the authenticity of a system component in accordance with the present invention;

FIG. 2 shows a schematic diagram of another embodiment of a method for detecting in accordance with the present invention to the invention; and FIG. 3 shows a schematic diagram of a system for detecting infringements of the authenticity of a system component in accordance with the present invention.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The described embodiments and developments may, if expedient, be combined with each other as desired. Further possible embodiments, developments and implementations of the invention also include combinations, which are not explicitly mentioned, of features of the invention described above or hereinafter with respect to the exemplary embodiments.

The accompanying drawings are intended to provide a further understanding of the embodiments of the invention. They illustrate embodiments and in conjunction with the description serve to explain the principles and concepts of the invention. Other embodiments and many of the advantages mentioned emerge in relation to the drawings. The elements of the drawings are not necessarily shown to scale with respect to each other. Identical reference numerals designate identical components or components with a similar action.

To ensure clarity, it is necessary to establish the definition of several important terms and expressions that will be used throughout this disclosure.

The term "system components" relate to components of machines, tools, systems, or similar complex technical devices, which are provided as part of the system of a separate manufacturer or supplier and whose originality, guarantee of origin and identity are to be ensured. System components can include, by way of example, machine parts, high-value consumables of machines such as toner cartridges, laser tubes, batteries, brake disks or similar components. However, it is understood that within the meaning of this application system components also include other components not mentioned but with similar properties.

The term "one-way functions" within the meaning of the present invention can include calculation functions which calculate an output according to pre-defined and known algorithms with the aid of a numerical or alphanumerical input. One-way functions can include, by way of example, hash functions, range of dispersion functions, checksum functions or similar functions. Such functions can be prototype-resistant, i.e. not allow any conclusions to be made from the output.

The one-way function can, moreover, be a low-collision one or be collision-resistant, i.e. it is extremely difficult to find a further prototype which generates the same output as a first prototype.

Turning now to the drawing, and in particular to FIG. 1, there is shown a schematic diagram of a method 10 for detecting infringements of the authenticity of a system component. To describe the method 10 reference is made to the elements of FIG. 3 which shows a schematic diagram of a system 30 for authenticating a system component 25.

In a first step 11 of the method 10 an authentication request is sent by a controller 22 to an authentication device 21. The controller 22 can be by way of example a server, a machine controller of the system or machine, in which the system component 25 is installed or fitted, or a machine interface ("human-machine-interface", HMI). The controller 22 can be locally set up in the region of the machine or system, by way of example in the factory or manufacturing plant, in which the system component 25 is located. It may also be possible for the controller 22 to be a portable device such as, by way of example, a laptop or a PDA, which can be used in the corresponding system in which the system component 25 is located.

The controller 22 comprises a transceiver 22a for sending the authentication request and this has a connection to the authentication device 21. The authentication device 21 can in turn comprise a calculating unit 21a which can receive the authentication requests of the transceiver 22a, and a memory 21b.

It may by way of example be possible for the authentication device 21 to be an RFID tag which is provided on an associated system component 25. The RFID tag can in this case comprise in the memory 21b an identification code such as, by way of example, a serial number or another identification number which allows conclusions to be made as to the identity of the associated system component 25.

In a second step 12 a first authentication code is calculated in the authentication device 21 on the basis of the identification code for the system component 25 stored in the memory 21b of the authentication device 21 with the aid of a one-way function. The first authentication code is calculated on instruction from the authentication request. Calculation can take place by way of example in the calculating unit 21a of the authentication device 21.

The one-way function can be by way of example a hash function which uses the identification code in the memory 21b as an input value to generate a hash output value as a first authentication code. The one-way function is known not only to the authentication device 21 but also to the controller 22, where the one-way function can be stored as configuration data by way of example in a database 22b of the controller 22.

In a third step 13 a second authentication code is calculated in the controller 22 on the basis of an identification code, stored in the database 22b, for the system component 25 of the controller 22 with the aid of the one-way function. Step 13 can be carried out simultaneously and independently of step 12 by way of example. A second authentication code is generated in the process which is stored in the controller 22. The second authentication code is calculated by a calculator 22c of the controller 22. The calculator 22c uses an identification code for the system component 25 which is stored in the database 22b of the controller 22.

The identification code in the database 22b and the identification code in the memory 21b of the authentication device 21 can preferably be compared in an initial authentication step. By way of example, during installation or initial operation of the system component 25 a maintenance or installation engineer can compare the identification code of the system component 25 with a global database belonging to the manufacturer or another certified center to check and confirm the authenticity of the system component 25. This comparison must be made just once before the beginning of the method 10, so the same identification codes exist as a starting condition in the memory 21b and in the database 22b.

If, specifically, an empty, defined initial value exists in the controller 22, the controller 22 can also incorporate the initially received authentication code, and log the setting up of the system 30, i.e. carry out an auto-synchronization. A pre-configuration of the system 30 can advantageously be omitted thereby, i.e. detection of infringements of the authenticity can take place without configuration since the controller 22 can automatically incorporate all parameters required for the method in a first communication with the system component 25. Incorporation of the parameters can be stored in a log for subsequent checking.

The identification code in the memory 21b does not necessarily have to be kept secret. It may, by way of example, be possible for the memory 21 to be accessible from the outside relatively easily, and for the identification code to be read out relatively easily. In an alternative embodiment it may however be provided that the memory 21b does not offer a read function for the data stored on the memory 21b, in particular for the identification code. This has the advantage that it is not possible for a potential attacker to read the identification code out of the memory 21b or to use it for an attempt at deception with an imitated system component.

The database 22b should accordingly also be secured against reading-out of the identification code stored there for the system component 25.

In a fourth step 14 an authentication response is sent with the first authentication code from the authentication device 21 to the controller 22. The calculating unit 21a of the authentication device 21 can transmit the response to the authentication request in step 11 to the transceiver 22a of the controller 22.

The channel via which the authentication request and the authentication response can be sent does not necessarily have to be designed so as to be tap- or readout-proof. A local wireless or wired data link by way of example can be established for this purpose. A conventional RFID reader can be used in the controller 22 in conjunction with an RFID tag in the authentication device 21, by way of example, and the authentication messages can be exchanged between the controller 22 and the authentication device 21 via RFID communication.

In a fifth step 15 the received first authentication code is compared with the stored second authentication code in the controller 22 to authenticate the system component 25. For this purpose the transceiver 22a can forward the response from the calculating unit 21a of the authentication device 21 with the first authentication code to the calculator 22c of the controller 22 in which the previously calculated second authentication code is stored. Since the first and second authentication codes have been calculated with the aid of the same one-way function and starting from an identical identification code, in the case of guaranteed authenticity of the system component 25 a match is to be anticipated when the authentication codes are compared.

If comparison of the first and second authentication codes does not produce a difference, or only produces an anticipated difference, by way of example if the system component 25 returns only some of the calculated authentication code, the system component 25 is deemed to be unchanged with respect to the initial authentication and is therefore classed as authentic. In this case it may by way of example be possible for the controller 22 to make an entry in a log, which can be stored in the database 22b, about the proper authentication of the system component 25. A time stamp and other parameters of the authentication request by way of example can be stored in the log.

For the case where comparison of the authentication codes delivers a result that differs from the expected one, by way of example because the system component 25 has in the meantime been exchanged for an incorrect system component, for example from a different manufacturer or a different brand, and calculation of the first authentication code consequently does not match calculation of the second authentication code in the controller 22, the controller 22 can prompt an incorrect entry in a corresponding log in the database 22b.

The same can apply for the case where communication between the controller 22 and the authentication device 21 is impaired. If, by way of example, sending of the authentication response to an authentication request fails, by way of example due to a power failure, failure of the communication cable or some other malfunction, the controller can prompt a corresponding event entry in a log in the database 22b. A time slot can be fixed for this purpose within which receipt of an authentication response to an authentication request must take place before the event entry is made in the log.

In each case subsequent authentication requests can be carried out by the controller 22 without reconfiguration of the system 30 being necessary following an error or a failed authentication. The last-supplied, different authentication code in the controller 22 is incorporated in the database 22b and calculation is continued starting from this authentication code (auto-synchronization). Nevertheless, a maintenance engineer, who regularly carries out maintenance or an inspection of the system 30, can read out the corresponding logs in the database 22b and evaluate the time and manner of errors that may have occurred.

FIG. 2 shows a schematic diagram of the sequence of a method 20 for detecting infringements of the authenticity of a system component.

An authentication device 21 and a controller 22 are shown which communicate with each other via a data link. The authentication device 21 and the controller 22 can match the devices shown in FIG. 3.

The controller 22 sends an authentication request 23a to the authentication device 21. With the aid of a one-way function f(x) the authentication device 21 calculates on the basis of an identification code ID, stored in the authentication device and identifying a system component 21, a first authentication code f(ID). This authentication code f(ID) is transmitted in an authentication response 24a to the controller 22. The controller compares the received authentication code f(ID) with an authentication code calculated internally in the controller 22 and thus authenticates the system component.

It may by way of example be provided that, following the first authentication, the authentication device 21 and the controller 22 replace the identification code ID respectively stored in associated databases or memories with the authentication code f(ID). This updated identification code f(ID) can then be used as the basis for calculation of further authentication steps.

Following a pre-determined time frame, by way of example after a few milliseconds or seconds, the controller 22 can direct a renewed authentication request 23b to the authentication device 21 which in turn calculates an authentication code with the aid of the one-way function f(x). Since the identification code now stored in the authentication device 21 is the original authentication code f(ID), the updated authentication code f(f(ID)) is transmitted in the authentication response 24b. Since the corresponding identification code f(ID) is also in the updated form in the controller 22, the comparison code calculated in the controller 22 will also be f(f(ID)).

The shorter the time frame between two authentication requests 23a and 23b is chosen to be, the more difficult it will be to tap and transmit a current authentication response to a potentially fake system component, i.e. a possible plagiarism, together with the physical installation of this potentially fake system component. Specifically it may be that the attacker requires physical access to the system component for this purpose, while with static identification methods it is possible to allow a time frame that is as long as desired to pass between tapping the authentication response and successful transmission thereof to a plagiarism. The present method according to FIG. 2 reduces the possible time frame for tapping, transmission of the valid authentication response to a plagiarism and sending the authentication response in a way that, by way of example, eavesdropping on configuration databases at the component manufacturer's, or "social engineering" in the case of engineers familiar with the system, or eavesdropping during transit or other attacks, which do not require any physical access to a system or to the system component, are no longer expedient for the attacker. The unauthorized mass transmission of tapped authentication responses in countries without copyright laws or a physically complex construction, exchange and installation of fake components is just as inexpedient because it would not be possible to use them within the defined time frame.

Following authentication the identification code can in turn be updated in both the authentication device 21 and the controller 22 to the last authentication code f(f(ID)).

This method can be repeated as often as desired, so the authentication code $f^n(ID)$ can be transmitted as authentication response 24n in response to an $n^{th}$ authentication request 23n.

In one possible embodiment it can be provided that a randomly generated request code, what is known as a "challenge", is transmitted with the authentication request 23 of the controller 22 to the authentication device 21, the challenge being taken into account in the one-way function during calculation of the authentication code. This has the advantage that authentication codes cannot be calculated in advance by potential attackers. This also has the advantage that the method is resistant to simple deception steps, which may be effective in conventional methods, such as by way of example an exchange of sequence numbers or time stamps.

For this purpose it can be provided that a secure random number generator, with the aid of which the challenges can be generated, is set up in the controller 22.

In a further embodiment it may be possible that with the authentication request 23 a number of iterations is transmitted to the controller 22 which indicates how often the one-way function is to be applied to the stored identification code. It may be possible for the identification code to be stored in the memory of the authentication device 21 so as to be secured against being read out and unchangeable, and the authentication code is generated on the basis of the unchangeable identification code via an application of the one-way function, iterated n times, to the identification code.

The described method and systems impede "cloning" attacks, i.e. the unauthorized or secret exchange of authenticated system components with non-authenticated ones, which may potentially occur in plagiarism protection solutions. Key management is not required here but only an implemented one-way function, preferably a prototype-resistant, low-collision hash function, and optionally a secure random generator on the controller side. Conventional RFID hardware and RFID software can be used without the security of the entire method or system being compromised.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for detecting infringements of an authenticity of a system component, said method comprising:
    sending an authentication request from a controller to an authentication device of the system component;
    calculating a first authentication code in the authentication device by applying a shared one-way function to a first identification code, stored in the authentication device, for the system component;
    calculating a second authentication code in the controller by applying the shared one-way function to a second identification code, stored in the controller, for the system component;
    sending an authentication response with the first authentication code from the authentication device to the controller; and
    comparing in the controller the first authentication code with the second authentication code for detecting infringements of the authenticity of the system component;
        replacing the second identification code stored in the controller with the calculated first authentication code received by the controller; and
        replacing the first identification code stored in the authentication device with the calculated first authentication code.

2. The method of claim 1, further comprising storing an error message in an error protocol in the controller when the comparison of the first authentication code with the second authentication code results in a difference between said first and said second authentication codes.

3. The method of claim 1, further comprising storing an error message in an error protocol in the controller, when the sending of the authentication response fails.

4. The method of claim 1, wherein the one-way function is a prototype-resistant low-collision hash function.

5. The method of claim 1, wherein the authentication request further comprises a randomly created request code, wherein calculation of the first authentication code in the authentication device and calculation of the second authentication code in the controller are further implemented on the basis of the randomly created request code.

6. A controller for detecting infringements of the authenticity of a system component, said controller comprising:
    a transceiver configured to send an authentication request to an authentication device of the system component, and to receive a first authentication code as a response to the authentication request, wherein said first authentication code is calculated by applying a shared one-way function to a first identification code, stored in the authentication device, for the system component;
    a database configured to store a second identification code for the system component; and
    a calculator configured to calculate a second authentication code by applying the shared one-way function to the second identification code stored in the database, and to compare the first authentication code with the second authentication code for detecting infringements of the authenticity of the system component, said controller being configured to replace the second identification code stored in the controller with the calculated first authentication code received by the controller; said authentication device configured to replace the first identification code stored in the authentication device with the calculated first authentication code.

7. The controller of claim 6, wherein the database is configured to store the first authentication code received by the transceiver as an updated identification code for the system component.

8. The controller of claim 6, wherein the calculator is configured to store an error message in an error protocol in the database, when the comparison of the first authentication code with the second authentication code results in a difference between the first and second authentication codes.

9. The controller of claim 6, wherein the calculator is configured to store an error message in an error protocol in the database, when the transceiver does not receive a response within a defined period of time after the authentication request.

10. The controller of claim 6, wherein the one-way function is a prototype-resistant, low-collision hash function.

11. A system for detecting infringements of the authenticity of a system component, said system comprising;
    an authentication device configured to calculate a first authentication code by applying a shared one-way function to a first identification code for the system component stored in the authentication device; and
    a controller—which includes
    a transceiver configured to send an authentication request to the authentication device, and to receive the first authentication code from the authentication device as a response to the authentication request,
    a database configured to store a second identification code for the system component, and
    a calculator configured to calculate a second authentication code by applying the shared one-way function to the second identification code stored in the database, and to compare the first authentication code with the second authentication code for detecting infringements of the authenticity of the system component, said controller being configured to replace the second identification code stored in the controller with the calculated first authentication code received by the controller; said authentication device configured to replace the first identification code stored in the authentication device with the calculated first authentication code.

12. The system of claim 11, wherein the transceiver is configured to send a randomly created request code as part of the authentication request, said authentication device configured to calculate the first authentication code by using the randomly created request code.

13. The system of claim 11, wherein the authentication device comprises a RFID-tag, said transceiver comprising a RFID-reading device.

* * * * *